United States Patent
Seff et al.

(10) Patent No.: US 7,520,759 B2
(45) Date of Patent: Apr. 21, 2009

(54) MODULAR BUS ASSEMBLY FOR A LOADCENTER

(75) Inventors: Paul David Seff, Lincoln, IL (US); Syed Manzural Karim, Lincoln, IL (US)

(73) Assignee: Eaton Corporation, Cleveland, OH (US)

( * ) Notice: Subject to any disclaimer, the term of this patent is extended or adjusted under 35 U.S.C. 154(b) by 335 days.

(21) Appl. No.: 11/476,348

(22) Filed: Jun. 28, 2006

(65) Prior Publication Data

US 2008/0003850 A1    Jan. 3, 2008

(51) Int. Cl.
*H01R 12/00* (2006.01)

(52) U.S. Cl. .................................... 439/76.2
(58) Field of Classification Search ............... 439/76.2, 439/64, 620.27, 212, 723, 949, 721, 724; 361/802, 399, 413, 415, 346, 353, 355, 358, 361/361, 363, 376
See application file for complete search history.

(56) References Cited

U.S. PATENT DOCUMENTS 4,164,362 A * 8/1979 Cobaugh et al. .............. 439/64
4,536,823 A * 8/1985 Ingram et al. ............... 361/637
5,474,475 A * 12/1995 Yamaguchi ............ 439/620.27

* cited by examiner

*Primary Examiner*—Edwin A. Leon
(74) *Attorney, Agent, or Firm*—Martin J. Moran

(57) ABSTRACT

A modular bus assembly for a loadcenter is provided. The loadcenter includes a non-conductive bus support assembly having a planar member with an upper side, a plurality of upper sidewalls, and at least one opening through the planar member. The plurality of upper sidewalls defining at least one upper channel. At least one lateral bus member having an elongated body with a first end terminal, a first lateral portion, an offset, central portion, an offset second lateral portion, and a second end terminal is disposed with the channel. The first end terminal, the first lateral portion, and the second end terminal are in, generally, a first plane. The offset, central portion is offset in a first direction from the first plane and the offset, second lateral portion is offset in a second direction from the first plane. In this configuration the lateral bus member is reversible so that either the offset central portion or the offset, second lateral portion is disposed within the planar member opening.

23 Claims, 5 Drawing Sheets

MODULAR BUS ASSEMBLY FOR A LOADCENTER

BACKGROUND OF THE INVENTION

1. Field of the Invention

The present invention relates to an electrical distribution loadcenter and, more specifically, to a modular bus assembly for a loadcenter having at least one lateral bus member.

2. Background Information

Electrical distribution loadcenters, typically, have multiple elongated, primary bus members extending through a housing. The primary bus members are coupled, typically via a primary circuit breaker, to a power source. The loadcenter also includes a plurality of secondary circuit breakers, or other electrical components, disposed on either, or both, sides of the primary bus members. To couple a primary bus member to a secondary circuit breaker, the loadcenter utilizes a bus assembly. The bus assembly includes a non-conductive bus support assembly and at least one lateral bus member. The bus assembly was, typically, attached to the loadcenter by one or more fasteners.

A typical prior art bus support assembly included a planar member that would extend across the primary bus members. An opening was provided in the planar member. A conductive spacer would be disposed in the planar member opening and placed in electrical communication with a primary bus member. An elongated lateral bus member was then coupled to the spacer and structured to extend generally perpendicular to the axis of the primary bus member. That is, the lateral bus member extended toward the secondary circuit breakers disposed on either, or both, sides of the primary bus members. The lateral bus member was then electrically coupled to the secondary circuit breakers.

Further, when a loadcenter incorporated multiple primary buses, the bus assembly had an equal number of lateral bus members. A common configuration had three primary buses and three lateral bus members. The three primary buses were, typically, disposed in a parallel manner. Thus, assuming the primary buses extended vertically, the lateral bus members were configured to be coupled to the left primary bus, the middle primary bus, or the right primary bus. That is, the lateral bus member had a specific configuration depending upon which primary bus the lateral bus member was to be coupled. Thus, three different types of lateral bus members had to be manufactured.

This type of bus assembly has several disadvantages. For example, the cost of manufacturing three different types of lateral bus members, as well as the labor in sorting and installing the three different types of lateral bus members made bus assemblies more expensive than necessary. Further, the prior art bus assembly included additional components, such as the spacers, that had to be installed. There is, therefore, a need for a bus assembly having a single type of lateral bus member that may be coupled to different primary buses. There is a further need for a bus assembly that does not require the use of a spacer between the primary bus and the lateral bus member. There is a further need for a bus assembly having a clip device structured to couple the bus assembly to the loadcenter.

SUMMARY OF THE INVENTION

These needs, and others, are met by at least one embodiment of the invention which provides a bus assembly having a lateral bus member with a single configuration that may be coupled to any one of multiple primary buses. The lateral bus member has a generally planar body with two offset potions. One offset portion is centrally disposed on the lateral bus member body and offset in a first direction. The other offset portion is disposed laterally to one side of the center portion and is offset in a second direction. In this configuration, the lateral bus member may be coupled to any primary bus without the use of a spacer.

That is, the bus assembly includes a non-conductive bus support assembly having a planar member with an opening therethrough. The lateral bus member is positioned on the bus support assembly with the offset portion disposed within the opening. A coupling device, such as, but not limited to, a threaded fastener extends through the offset portion and into the primary bus, thereby coupling the buses together. Because the offset portion extends into the opening, a spacer is not required.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

As used herein, the word "associated" when used in relation to a channel means that the "associated" element passes through, is coupled to, or otherwise related to the described channel.

As used herein, directional terms, e.g., "above," "below," "left," "right," etc., are used for convenience relative to the Figures and are not intended to limit the claims.

As used herein, "coupled" means a link between two or more elements, whether direct or indirect, so long as a link occurs.

Figure 1:
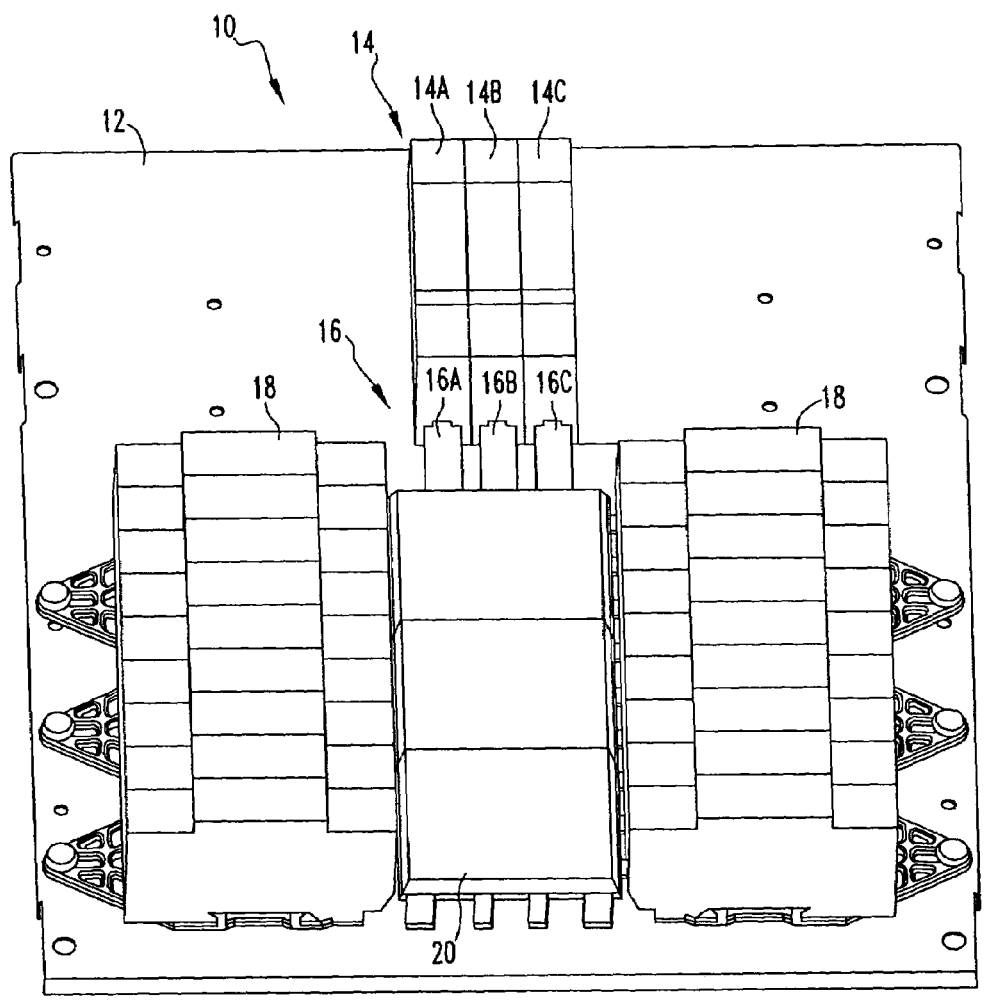
FIG. 1 is an isometric view of a loadcenter.

As shown in FIG. 1, a loadcenter 10 includes a housing assembly (shown in part) having a back panel 12, at least one primary circuit breaker 14 which, preferably, includes three primary circuit breakers 14A, 14B, 14C, at least one primary bus 16 which, preferably, includes three primary buses 16A, 16B, 16C, and a plurality of secondary circuit breakers 18 or other electronic devices. Each primary bus 16A, 16B, 16C is coupled to, and in electrical communication with, one primary circuit breaker 14A, 14B, 14C. The primary buses 16A, 16B, 16C are elongated and extend generally parallel to each other. Each primary bus 16A, 16B, 16C has a coupling device opening 19 (FIG. 3), preferably a threaded opening, structured to be engaged by a coupling device 100. As shown, the primary buses 16A, 16B, 16C extend generally vertical and the secondary circuit breakers 18 are disposed laterally, that is, to the left and/or right of the primary buses 16A, 16B, 16C.

Figure 2:
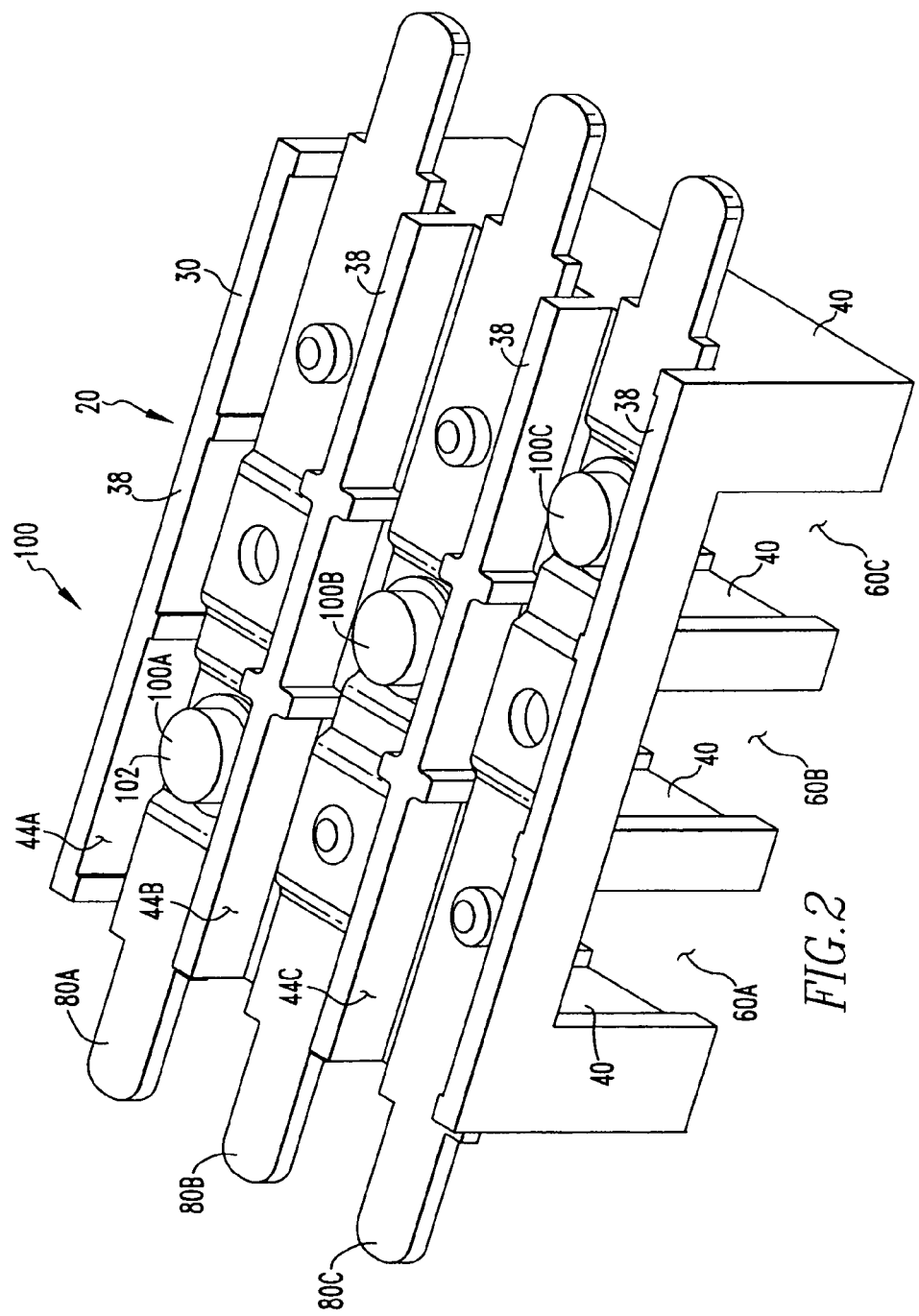
FIG. 2 is a top isometric view of a bus assembly.

At least one modular bus assembly 20 is structured to electrically couple the primary buses 16A, 16B, 16C and the secondary circuit breakers 18. As shown in FIG. 2, a bus assembly 20 includes a non-conductive bus support assembly 30 having a planar member 32 with an upper side 34, a lower side 36 (FIG. 4), a plurality of upper sidewalls 38, a plurality of lower sidewalls 40 and at least one opening 42 through the planar member 32. The bus support assembly 30, which is preferably rectangular, has a first axis 1 and a second axis 2. The first and second axes 1, 2 extend generally perpendicular to each other. As shown in FIG. 1, the first axis 1 extends generally horizontally and the second axis 2 extends generally vertically.

Figure 3:
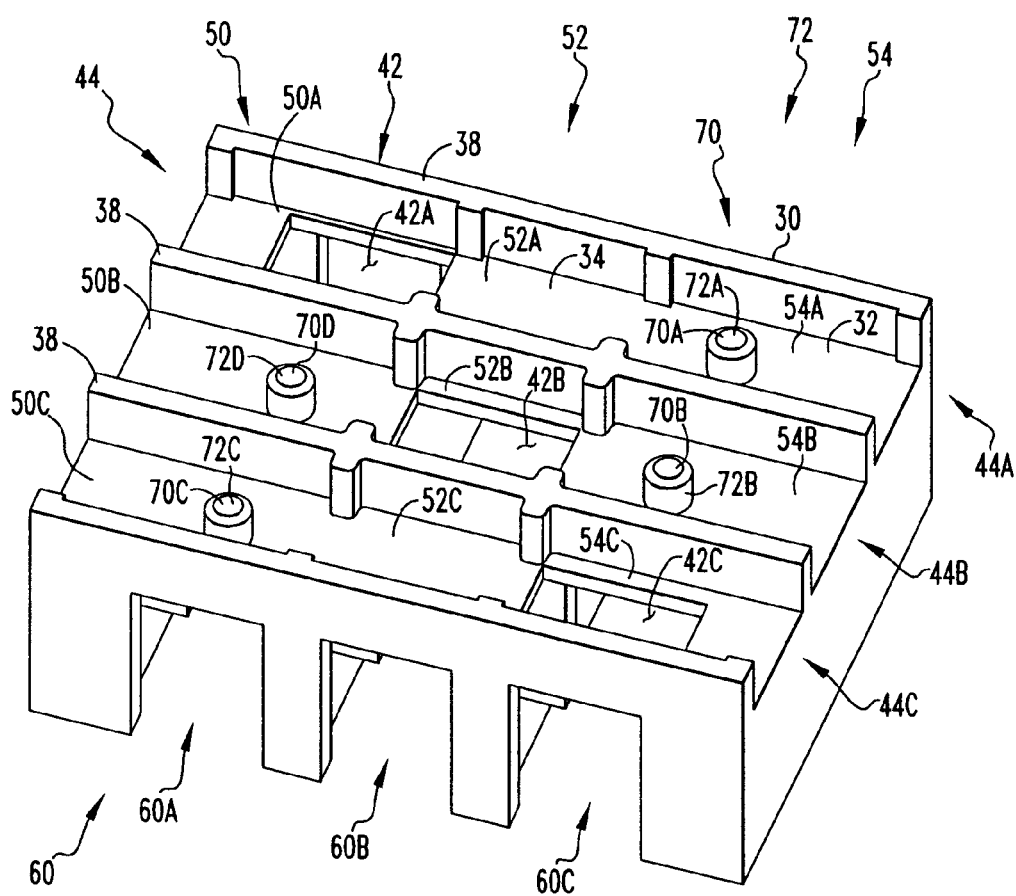
FIG. 3 is a top isometric view of a bus support assembly.

As shown in FIG. 3, each upper sidewall 38 extends generally perpendicular to the planar member upper side 34. The plurality of upper sidewalls 38 define at least one upper channel 44 and, where there are three primary buses 16A, 16B, 16C, preferably three upper channels, a first upper channel 44A, a second upper channel 44B, and a third upper channel 44C. The second upper channel 44B is disposed between the first and third upper channels 44A, 44C. The upper channels 44 extend generally parallel to the first axis 1. Each upper channel 44 has a first lateral portion 50, a central portion 52, and a second lateral portion 54. Thus, there is a first upper channel first lateral portion 50A, a first upper channel central portion 52A, and a first upper channel second lateral portion 54A. Similarly, there is a second upper channel first lateral portion 50B, a second upper channel central portion 52B, and a second upper channel second lateral portion 54B, as well as, a third upper channel first lateral portion 50C, a third upper channel central portion 52C, and a third upper channel second lateral portion 54C.

Figure 4:
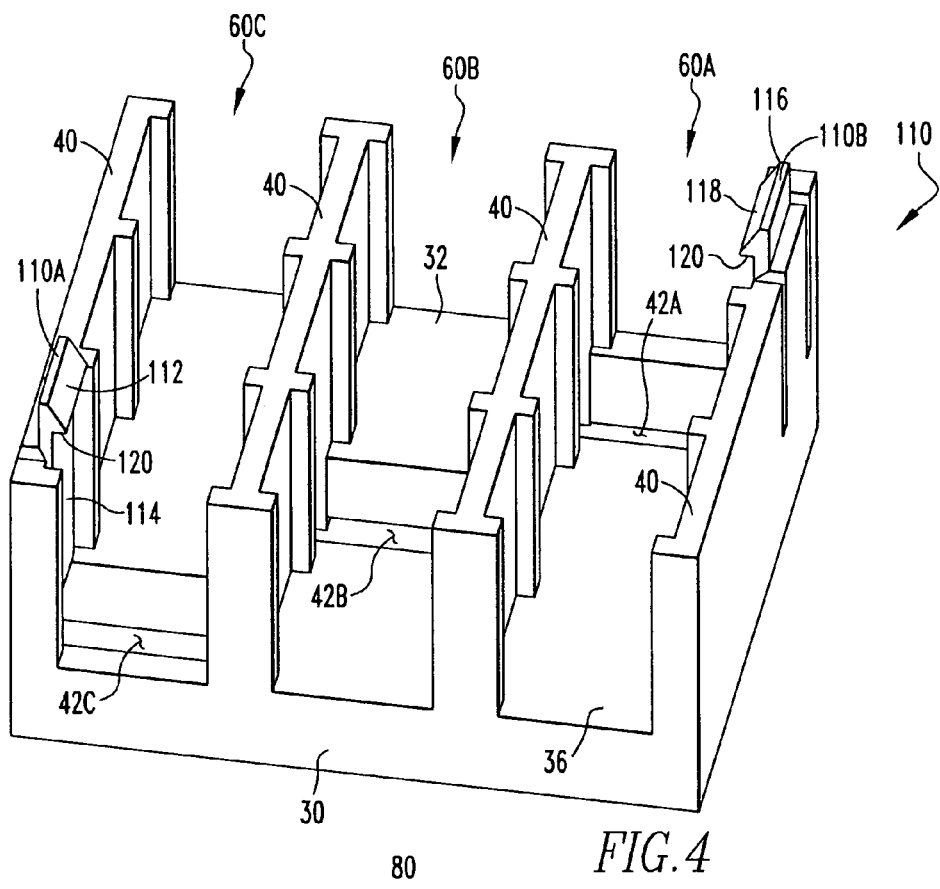
FIG. 4 is a bottom isometric view of a bus support assembly.

As shown in FIG. 4, each lower sidewall 40 extends generally perpendicular to the planar member lower side 36. The plurality of lower sidewalls 40 define at least one lower channel 60 and, where there are three primary buses 16A, 16B, 16C, preferably three lower channels 60, a first lower channel 60A, a second lower channel 60B, and a third lower channel 60C. The second lower channel 60B is disposed between the first and third lower channels 60A, 60C. The lower channels 60 extend generally parallel to the second axis 2. The lower channels 60 are sized so that the primary buses 16A, 16B, 16C may extend therethrough.

The at least one opening 42 through the planar member 32 extends between the at least one upper channel 44 and the at least one lower channel 60. Where there are three upper channels 44A, 44B, 44C and three lower channels 60A, 60B, and 60C, there are, preferably, three openings 42A, 42B, 42C. The first opening 42A extends between the first upper channel 44A and the first lower channel 60A. The second opening 42B extends between the second upper channel 44B and said second lower channel 60B. The third opening 42C extends between the third upper channel 44C and the third lower channel 60C. In the preferred embodiment, the first opening 42A is disposed at the first upper channel first lateral portion 50A, the second opening 42B is disposed at the second upper channel central portion 52B, and the third opening 42C is disposed at the third upper channel second lateral portion 54C.

Additionally, at least one upper channel 44 may include at least one positioning component 70. As shown in FIG. 3, each positioning component 70 is structured to loosely engage a lateral bus member coupling device passages 94 (described below). Where there are three upper channels 44A, 44B, 44C, there are, preferably, at least three positioning components 70, a first positioning component 70A, a second positioning component 70B, and a third positioning component 70C, with at least one positioning component 70A, 70B, 70C disposed in each of the upper channels 44A, 44B, 44C. The second upper channel 44B may have two positioning components 70. As detailed below, the second upper channel 44B may have the second positioning component 70B as well as a fourth positioning component 70D. In the preferred embodiment, the first positioning component 70A is disposed on the first upper channel second lateral portion 54A, the second positioning component 70B and the fourth positioning component 70D are disposed on the second upper channel first lateral portion 50B and second upper channel second lateral portion 54B respectively, and the third positioning component 70C is disposed upon the third upper channel first lateral portion 50C. Preferably, each positioning component 70A, 70B, 70C, 70D is a stud 72 as shown in FIG. 3, studs 72A, 72B, 72C, 72D, extending upwardly from the planar member upper side 34.

Figure 5:
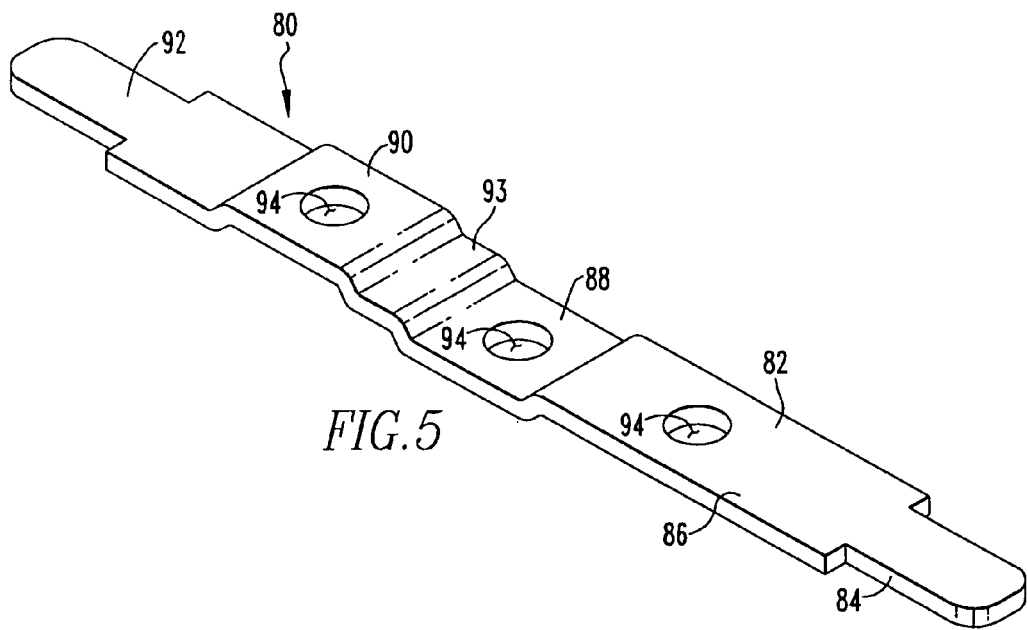
FIG. 5 is an isometric view of a lateral bus member.

The bus assembly 20 further includes at least one lateral bus member 80. As shown in FIG. 5, the lateral bus member 80 has an elongated body 82 with a first end terminal 84, a first lateral portion 86, an offset, central portion 88, an offset second lateral portion 90, and a second end terminal 92. The lateral bus member body 82 is sized to fit within the at least one upper channel 44. The lateral bus member body 82 is, preferably, elongated and generally flat except for the offset portions 88, 90. That is, the first end terminal 84, the first lateral portion 86, and the second end terminal 92 are in, generally, a first plane. The offset, central portion 88 is offset in a first direction from the first plane and the offset, second lateral portion 90 is offset in a second direction from the first plane. The lateral edges of the offset portions 88, 90 are preferably sloped. Between the offset, central portion 88 and the offset, second lateral portion 90 there may be a transition portion 93 that is disposed in the first plane. The first end terminal 84 and the second end terminal 92 are each structured to be coupled to a secondary circuit breaker 18 or other device. The at least one lateral bus member 80 further includes at least one, and preferably three, coupling device passages 94. Each coupling device passage 94 is, preferably, a non-threaded opening. The coupling device passage 94, preferably, does not include threads. If there is only one coupling device passage 94, the coupling device passage 94 is disposed on either of the offset portions 88, 90. In the preferred embodiment, there are three coupling device passages 94, with one coupling device passage 94 located at the first lateral portion 86, the offset, central portion 88, and the offset second lateral portion 90. In this configuration the lateral bus member 80 is reversible so that either the offset central portion 88 or the offset, second lateral portion 90 is disposed within the at least one planar member opening 42, as described below.

In the preferred embodiment with three primary buses 16A, 16B, 16C, three upper channels 44A, 44B, 44C, and three lower channels 60A, 60B, 60C, a first lateral bus member 80A may be disposed in the first upper channel 44A. As the first opening 42A is disposed at the first upper channel first lateral portion 50A, the first lateral bus member 80A is oriented with the offset second lateral portion 90 disposed adjacent to the first opening 42A (to the left as shown) and extending toward the planar member 32. The first lateral bus member 80A offset, central portion 88 therefore extends away from the planar member 32. The first lateral bus member 80A is then disposed within the first upper channel 44A with the offset second lateral portion 90 extending into the first opening 42A. In this configuration, the first positioning component 70A is disposed on the first upper channel second lateral portion 54A also engages the first lateral bus member coupling device passage 94 located on the first lateral bus member 80A first lateral portion 86.

A second lateral bus member 80B may be disposed in the second upper channel 44B. As the second opening 42B is disposed at the second upper channel central portion 52B, the second lateral bus member 80B is oriented with the offset, central portion 88 extending toward the planar member 32.

The second lateral bus member 80B offset second lateral portion 90 therefore extends away from the planar member 32. The second lateral bus member 80B offset second lateral portion 90 may be disposed on either side of the second lateral bus member 80B offset, central portion 88. Additionally, the second positioning component 70B and the fourth positioning component 70D, which are disposed on the second upper channel first lateral portion 50B and second upper channel second lateral portion 54B, will engage the coupling device passages 94 located on the second lateral bus member 80B first lateral portion 86 and offset second lateral portion 90.

A third lateral bus member 80C may be disposed in the third upper channel 44C. As the third opening 42C is disposed at the third upper channel second lateral portion 54C, the third lateral bus member 80C is oriented with the offset second lateral portion 90 disposed adjacent to the third opening 42C (to the right as shown) and extending toward the planar member 32. The third lateral bus member 80C offset, central portion 88 therefore extends away from the planar member 32. The third lateral bus member 80C is then disposed within the third upper channel 44C with the offset second lateral portion 90 extending into the third opening 42C. In this configuration, the third positioning component 70C, which is disposed on the third upper channel first lateral portion 50C, also engages the third lateral bus member coupling device passage 94 located on the third lateral bus member 80C first lateral portion 86.

A lateral bus member 80 is coupled to, and placed in electrical communication with, at least one primary bus 16 by a coupling device 100, preferably a threaded fastener 102. That is, with at least one lateral bus member 80 disposed in an upper channel 44 with either offset portion 88, 90 disposed in a planar member opening 42, the bus assembly 20 is placed over the at least one primary bus 16 with the planar member opening 42 disposed over the at least one primary bus coupling device opening 19. The coupling device 100 is passed through the at least one coupling device passage 94 in the lateral bus member 80 as well as the planar member opening 42 and engages the at least one primary bus coupling device opening 19. Where there are three primary buses 16A, 16B, 16C and three lateral bus members 80A, 80B, 80C, there are three coupling devices 100A, 100B, 100C.

Figure 6:
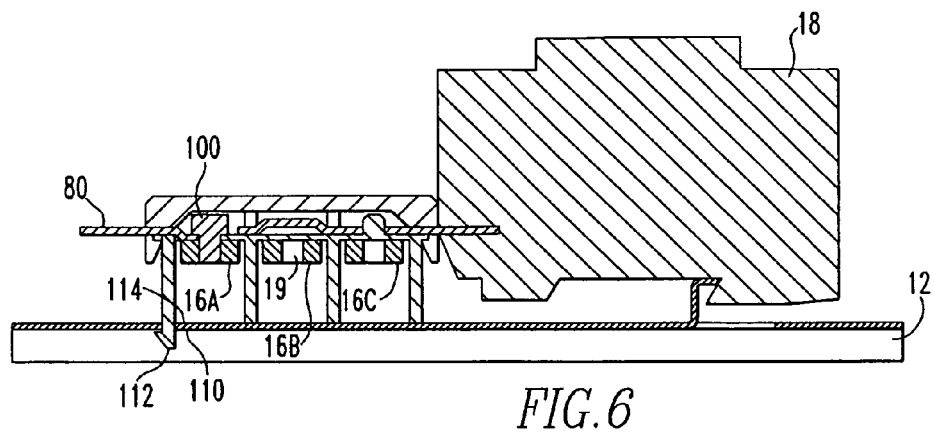
FIG. 6 is a cross-sectional view of a loadcenter.

As shown in FIG. 6, the bus assembly 20 may also include at least one resilient coupling device 110 disposed on the planar member lower side 36. The at least one resilient coupling device 110 is, preferably a resilient clip 112 having an elongated, flexible body 114 extending from the planar member lower side 36. The flexible body 114 has a distal tip 116 with a sloped outer tip 118 and a perpendicular surface 120. The loadcenter back panel 12 has a plurality of clip openings 13 sized to allow the distal tip 116 of the at least one resilient coupling device 110 to pass therethrough. The clip openings 13 are positioned on the loadcenter back panel 12 so that, when the bus assembly 20 is positioned over the at least one primary bus 16, the at least one resilient coupling device distal tip 116 must be flexed in order to pass through the clip opening 13. Once the at least one resilient coupling device distal tip 116 passes through the clip opening 13, the at least one resilient coupling device 110 returns to the unflexed condition and the at least one resilient coupling device perpendicular surface 120 engages the loadcenter back panel 12. Preferably, there are two resilient coupling devices 110A, 110B.

Figure 7:
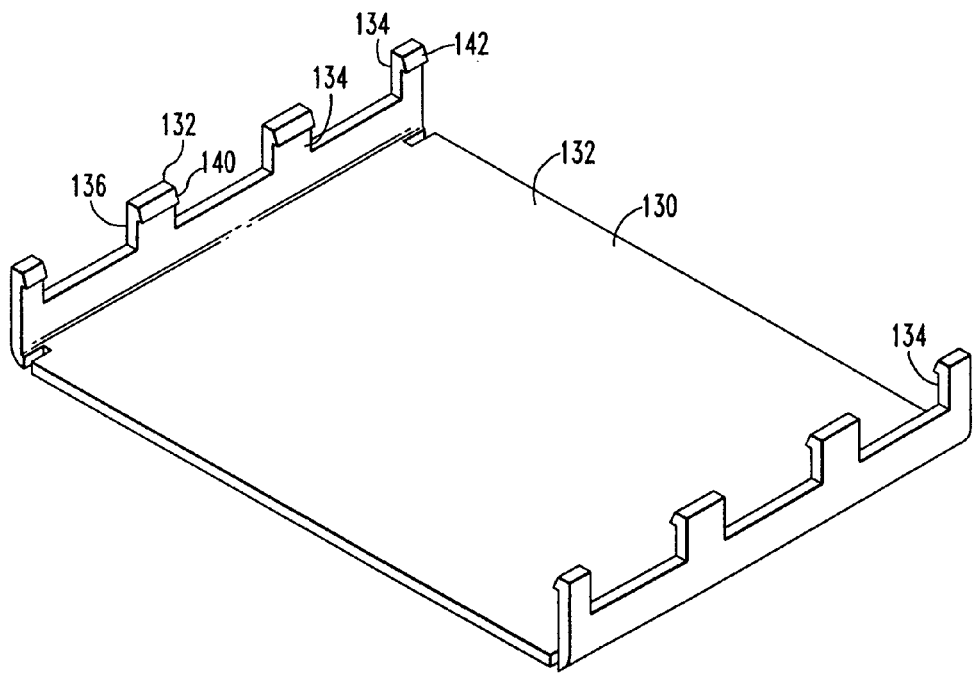
FIG. 7 is an isometric view of a bus assembly cover.

As shown in FIG. 7, the bus assembly 20 may also include a cover 130. The cover 130 has a planar member 132 and a plurality of resilient clips 134. The cover planar member 132 has generally the same cross-sectional areas as, or slightly larger than, the bus support assembly planar member 32. The resilient clips 134 each have an elongated, flexible body 136 extending from the edge of, and generally perpendicular to, the cover planar member 132. Each cover resilient clip 134 has a distal tip 138 with a sloped outer tip 140 and a perpendicular surface 142. When the cover 130 is placed over the bus support assembly planar member 32 with the cover resilient clips 134 extending toward the bus support assembly planar member 32, the cover resilient clip 134, and more particularly the cover resilient clip perpendicular surface 142, engage the planar member lower side 36. In this configuration, the cover 130 substantially encloses each lateral bus member 80.

The embodiment of the lateral bus member 80 described above has the advantage of being reversible. That is, the lateral bus member 80 may be oriented so that an offset portion 88, 90 is always disposed within the at least one opening 42. However, another embodiment of the invention may be practiced wherein a lateral bus member 180 has a single offset portion 200. For example, a lateral bus member 180A having a single offset lateral portion 190 has an elongated body 182 with a first end terminal 184, a first lateral portion 186, a central portion 188, an offset second lateral portion 190, and a second end terminal 192. The lateral bus member body 182 is sized to fit within the at least one upper channel 44. The lateral bus member body 182 is, preferably, elongated and generally flat except for the offset portion 190. That is, the first end terminal 184, the first lateral portion 186, the central portion 188 and the second end terminal are in, generally, a first plane. The lateral edges of the offset portion 190 are, preferably, sloped. The first end terminal 184 and the second end terminal 192 are each structured to be coupled to a secondary circuit breaker 18 or other device. The lateral bus member 180 may also include at least one, and preferably three, coupling device passages 94 as described above. In this embodiment, the lateral bus member 180 may be disposed in either the first upper channel 44A or the third upper channel 44C of the bus support assembly 30 described above. That is, the offset second lateral portion 190 may be positioned within the first upper channel 44A or the third upper channel 44C with the offset second lateral portion 190 extending into the first opening 42A or the third opening 42C respectively.

In a similar embodiment, which is structured to be disposed within the second upper channel 44B, a lateral bus member 280 has a single offset center portion 290. In this embodiment, the lateral bus member 280 has an elongated body 282 with a first end terminal 284, a first lateral portion 286, an offset central portion 288, a second lateral portion 290, and a second end terminal 292. The lateral bus member body 182 is sized to fit within the at least one upper channel 44. The lateral bus member body 282 is, preferably, elongated and generally flat except for the offset portion 288. That is, the first end terminal 284, the first lateral portion 286, the second lateral portion 290 and the second end terminal 292 are in, generally, a first plane. The lateral edges of the offset portion 288 are, preferably, sloped. The first end terminal 284 and the second end terminal 292 are each structured to be coupled to a secondary circuit breaker 18 or other device. The lateral bus member 280 may also include at least one, and preferably three, coupling device passages 94 as described above. In this embodiment, the lateral bus member 180 may be disposed in the second upper channel 44B of the bus support assembly 30 described above. That is, the offset central portion 288 may be positioned within the second upper channel 44B with the offset central portion 288 extending into the second 42B.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A modular bus assembly for a loadcenter comprising:
a non-conductive bus support assembly having a planar member with an upper side, a plurality of upper sidewalls, and at least one opening through said planar member;
each said upper sidewall extending generally perpendicular to said planar member upper side, said plurality of upper sidewalls defining at least one upper channel;
at least one lateral bus member having an elongated body with a first end terminal, a first lateral portion, an offset, central portion, an offset second lateral portion, and a second end terminal, said lateral bus member body sized to fit within said at least one upper channel;
wherein said first end terminal, said first lateral portion, and said second end terminal are in, generally, a first plane, said offset, central portion is offset in a first direction from said first plane and said offset, second lateral portion is offset in a second direction from said first plane; and
wherein said lateral bus member is reversible so that either said offset central portion or said offset, second lateral portion is disposed within said planar member opening.

2. The modular bus assembly of claim 1 wherein said non-conductive bus support assembly includes a cover, said cover having a planar member and a plurality of resilient clips, said cover resilient clips extending generally perpendicular to said cover planar member, said cover resilient clips structured to engage said bus support planar member.

3. The modular bus assembly of claim 1 wherein said at least one lateral bus member includes at least one coupling device passage.

4. The modular bus assembly of claim 3, wherein said at least one coupling device passage is disposed at a location selected from the group comprising said bus member offset central portion or said bus member offset, second lateral portion.

5. The modular bus assembly of claim 4 wherein:
said planar member includes at least one positioning component, said positioning component disposed within said at least one upper channel; and
wherein said at least one positioning component is structured to engage said at least one coupling device passage.

6. The modular bus assembly of claim 5 wherein said at least one positioning component includes a stud extending upwardly from said planar member tipper side.

7. The modular bus assembly of claim 5, wherein said at least one coupling device passage includes three passages, one coupling device passage disposed at each of said bus member first lateral portion, said bus member offset central portion and said bus member offset, second lateral portion.

8. The modular bus assembly of claim 7 wherein:
said plurality of upper sidewalls define three elongated, generally parallel upper channels, a first upper channel, a second upper channel, and a third upper channel, said second upper channel being disposed between said first upper channel and said third upper channel;
each of said first upper channel, second upper channel and third upper channel having a first lateral portion, a central portion, and a second lateral portion;

said at least one lateral bus member includes three lateral bus members;
said at least one opening through said planar member includes three openings, a first opening, a second opening, and a third opening, one opening disposed within each said upper channel; and
wherein each said lateral bus member is disposed within a separate upper channel with each said lateral bus member having an offset portion extending into said associated upper channel planar member opening.

9. The modular bus assembly of claim 8 wherein said at least one positioning component includes at least three studs, a first stud, a second stud and a third stud, each stud extending upwardly from said planar member upper side, one stud disposed within each of said first upper channel, second tipper channel, and third upper channel, and wherein each said stud is structured to engage one of said coupling device passage on said lateral bus member associated with said channel.

10. The modular bus assembly of claim 8 wherein:
said planar member opening in said first upper channel is disposed at said first tipper channel first lateral portion and said first stud is disposed on said first upper channel second lateral portion;
said planar member opening in said second upper channel is disposed at said second upper channel central portion and said second stud is disposed on said second upper channel second lateral portion; and
said planar member opening in said third upper channel is disposed at said third upper channel second lateral portion and said third stud is disposed on said third upper channel first lateral portion.

11. The modular bus assembly of claim 10 wherein said at least three studs includes a fourth stud, said fourth stud disposed on said second upper channel first lateral portion.

12. The modular bus assembly of claim 1, wherein said loadcenter has at least one generally elongated primary bus having a coupling device opening structured to be engaged by a coupling device, and wherein:
said bus support assembly has a first axis, a second axis, said bus support assembly planar member has a lower side with a plurality of lower sidewalls, and a coupling device;
said first and second axes being generally perpendicular to each other, said second axis extending generally parallel to said primary bus axis;
said at least one upper channel extending in a direction generally parallel to said first axis;
each said lower sidewall extending generally perpendicular to said planar member lower side and said plurality of lower sidewalls defining at least one lower channel extending in a direction generally parallel to said second axis;
said at least one lower channel sized to allow said at least one primary bus to pass therethrough;
said at least one opening extending between said at least one upper channel and said at least one lower channel and aligned with said at least one primary bus coupling device opening;
wherein, said least one lateral bus member is disposed within said at least one upper channel with an offset portion extending into said at least one planar member opening and coupled to, and in electrical communication with, said at least one primary bus.

13. The modular bus assembly of claim 12 wherein:
said at least one lateral bus member includes at least one coupling device passage, and, when at least one lateral bus member is disposed within said at least one channel, said at least one coupling device passage is aligned with said at least one planar member opening; and said coupling device extends through said at least one coupling device passage and said at least one planar member opening and is coupled to said at east one primary bus coupling device opening.

14. The modular bus assembly of claim 13, wherein said at least one coupling device passage is disposed at a location selected from the group comprising said bus member offset central portion or said bus member offset, second lateral portion.

15. The modular bus assembly of claim 14, wherein said at least one coupling device passage includes three passages, one passage disposed at each of said bus member first lateral portion, said bus member offset central portion and said bus member offset, second lateral portion.

16. The modular bus assembly of claim 15 wherein:

said planar member includes at least one positioning component, said positioning component disposed within said at least one upper channel; and wherein said at least one positioning component is structured to engage at least one coupling device passage.

17. The modular bus assembly of claim 16 wherein said at least one positioning component includes a stud extending upwardly from said planar member upper side.

18. The modular bus assembly of claim 17 wherein:

said plurality of upper sidewalk define three elongated, generally parallel upper channels, a first upper channel, a second upper channel, and a third upper channel, said second channel being disposed between said first channel and said third channel;

said plurality of lower sidewalls define three elongated, generally parallel lower channels, a first lower channel, a second lower channel, and a third lower channel, said second lower channel being disposed between said first lower channel and said third lower channel;

each of said first upper channel, second upper channel and third upper channel having a first lateral portion, a central portion, and a second lateral portion;

said at least one lateral bus member includes three lateral bus members;

said at least one opening through said planar member includes three openings, a first opening, a second opening, and a third opening;

said first opening extending between said first upper channel and said first lower channel;

said second opening extending between said second upper channel and said second lower channel; said third opening extending between said third upper channel and said third lower channel; and wherein each said lateral bus member is disposed within a separate channel with each said lateral bus member having an offset portion extending into said associated planar member opening.

19. The modular bus assembly of claim 18 wherein said at least one positioning component includes at least three studs, a first stud, a second stud and a third stud, each stud extending upwardly from said planar member upper side, one stud disposed within each of said first upper channel, second upper channel, and third upper channel, and wherein each said stud is structured to engage one of said coupling device passages on said lateral bus member associated with said upper channel.

20. The modular bus assembly of claim 18 wherein:

said planar member opening in said first channel is disposed at said first upper channel first lateral portion and said first stud is disposed on said first upper channel second lateral portion;

said planer member opening in said second channel is disposed at said second upper channel central portion and said second stud is disposed on said second upper channel second lateral portion; and said planar member opening in said third channel is disposed at said third upper channel second lateral portion and said third stud is disposed on said third upper channel first lateral portion.

21. The modular bus assembly of claim 20 wherein said at least three studs includes a fourth stud, said fourth stud disposed on said second upper channel first lateral portion.

22. The modular bus assembly of claim 1 wherein said non-conductive bus support planar member includes a lower side, said lower side having at least one resilient coupling device disposed thereon.

23. The modular bus assembly of claim 22 wherein, said loadcenter includes a panel having a plurality of clip openings and, wherein:

said resilient coupling device includes two resilient clips, said resilient clips each structured to engage one said clip opening.

* * * * *